United States Patent [19]

Lakernik et al.

[11] 4,131,451

[45] Dec. 26, 1978

[54] METHOD FOR REMOVING ZINC FROM ZINC-CONTAINING SLAGS

[76] Inventors: Mark M. Lakernik, Strastnoi bulvar, 13a, kv. 32; Roza I. Shabalina, ulitsa Udaltsova, 4, kv. 26; Alexandr F. Gavrilenko, ulitsa Yaroslavskaya, 1/9, kv. 71; Anatoly A. Yakovenko, bulvar Yana Rainisa, 14, korpus 2, kv. 73; Anatoly I. Golovachev, Otkrytoe shosse, 6, kv. 48; Tatyana S. Egorova, ulitsa Mescheryakova, 9, kv. 2, all of Moscow, U.S.S.R.

[21] Appl. No.: 795,485

[22] Filed: May 10, 1977

[51] Int. Cl.$^2$ ............................................... C22D 7/06
[52] U.S. Cl. .......................................... 75/14; 75/24; 75/88
[58] Field of Search .................... 75/24, 14, 86, 87, 88

[56] References Cited

U.S. PATENT DOCUMENTS

| | | | |
|---|---|---|---|
| 1,815,260 | 7/1931 | Kemmer | 75/88 |
| 2,685,506 | 8/1954 | Schereschewsky | 75/87 |

*Primary Examiner*—M. J. Andrews
*Attorney, Agent, or Firm*—J. Harold Nissen

[57] ABSTRACT

A method for removing zinc from zinc-containing slags resides in that zinc is recovered from a bath of said slag by introducing a reducing agent, such as coke, thereinto, and by further blowing nitrogen into said bath in an amount of 0.5 to 3.5 Nm$^3$/min.m$^2$ of the bath surface and at a molten slag temperature of 1220 to 1400° C, preferably within the range of from 1220 to 1290° C.

The invention makes it possible to step up the rate of zinc recovery up to 2.3 kg/min.m$^2$ of the bath surface, reduce power input by 30 to 40%, and thereby to cut down expenses involved in the process as a whole.

8 Claims, No Drawings

METHOD FOR REMOVING ZINC FROM ZINC-CONTAINING SLAGS

The present invention relates to non-ferrous metallurgy, and more particularly to a method for the recovery of zinc from zinc-containing slags.

BACKGROUND OF THE INVENTION

For example, there is known in the art a method for removing zinc from zinc-containing slags in electric furnace by reducing zinc, which method comprises the steps of pre-melting slag in the presence of a sulphudizing agent, and treatment of slag at a temperature of not less than 1450° with carbonaceous reducing agent taken in an amount of 10 to 15 percent by weight of zinc contained in the slag, with electrodes being immersed to a depth of 0.85 to 0.90 of the slag bath depth.

The disadvantage of the aforedescribed method is low rate (0.3 kg/min.m$^2$ of the molten bath surface) of zinc recovery and high temperatures required for effecting the process.

There is known another method for removing zinc from zinc-containing slags, wherein recovery of zinc is carried out at a temperature of 1300 to 1500° C. with silico-aluminum alloy which is introduced into a molten bath of zinc-containing slag in a flow of an inert or natural gas.

The above-mentioned method suffers from a disadvantage which resides in that the process is run at high temperature of the molten bath, ranging from 1300 to 1500° C., which increases power input. Overheating of slag only by as much as 200° C., that is raising the temperature from 1300 to 1500° C., increases the power input per ton of slag by 15 to 20 percent. Taking into account the heat losses occurring in the furnace, the power input will increase to 50 percent. High temperatures of the process substantially impair durability of the refractory lining. In addition, the employment of metallic reducing agent, i.e. silico-aluminum alloy, requires additional expences for its production.

There is widely known in the art still another method for removing zinc from zinc-containing slags by slag fuming, i.e. by blowing a flow of natural gas or a mixture of coal dust and air through a molten slag bath.

The disadvantage of the aforementioned method lies in the intermittance of the process, large consumption of coal, necessity for additional equipment for crushing the coal and shipment of its dust, large consumption of air, and the resultant large volume of effluent gases which necessitate special cooling and cleaning systems.

There is likewise known a method for removing zinc from zinc-containing slags, wherein zinc is recovered by dissolving carbon in the molten iron bath disposed under a layer of molten slag at a temperature of 1500 to 1600° C.

The disadvantage of the aforesaid method is high temperatures at which the process is run, and the difficulty of carbonization of molten iron under the layer of slag.

It is an object of the present invention to provide a method for removing zinc from zinc-containing slags, which permits of carrying out continuous process of zinc removal at a higher rate to be combined with lower power input.

This object is accomplished by the provision of a method for removing zinc from zinc-containing slags, comprising the steps of recovering zinc by introducing a reducing agent into a molten bath of said slag, and by further feeding into said molten slag bath of an inert gas, wherein, according to the invention, nitrogen is used as the inert gas in an amount of 0.5 to 3.5 Nm$^3$/min.m$^2$ of the molten bath surface, at a temperature of the molten slag being within the range of from 1220 to 1400° C.

In accordance with the invention it is preferrable that the process should be run at a temperature of 1200 to 1290° C.

In accordance with the invention it is advantageous that the depth of the slag bath be maintained within the range from 500 to 1000 mm, and the flow rate of nitrogen introduced into the molten bath be maintained within the range from 30 to 100 m/sec.

The invention makes it possible to raise the zinc recovery rate up to 2.3 kg/min.m$^2$ of the molten bath surface at lower power inputs.

These and other objects and advantages of the invention will become more apparent from the following detailed description thereof.

The herein proposed method is realised as follows.

Pre-melted zinc-containing slag is intermittently or continuously delivered to the reduction zone of an electric furnace. The slag is charged into the furnace in an amount sufficient to maintain the depth of the slag molten bath in the reduction zone within the range from 500 to 1000 mm. Charged into the said zone is coke, used as a reducing agent, which is superimposed on the molten bath.

Immersed into the molten slag is a gas supply means, for example, tuyeres, through which a flow of nitrogen is continuously delivered at a rate of 0.5 to 3.5 Nm$^3$/min.m$^2$ of the molten bath surface. The molten bath temperature is preferably maintained in the furnace within the range of 1220 to 1290° C.

There takes place in the furnace thorough mixing of the slag bath under the action of dynamic head ensuing from the incoming flow of nitrogen, which results in more intimate contact between the slag and coke, thereby providing for higher rate of the zinc recovery and, consequently, higher rate of the zinc removal from the slag.

The recovered zinc in the form of vapours volatilizes to be further separated in the form of liquid metal, metal powder or oxidized zinc dust. The spent slag is tapped out.

The flow rate of nitrogen blown through the slag bath should be within the aforeindicated range of from 0.5 to 3.5 Nm$^3$/min.m$^2$ of the molten bath surface.

The flow rate of nitrogen in an amount of less than 0.5 Nm$^3$/min.m$^2$ of the molten bath surface is insufficient for appropriate slag agitation, which prevents from achieving the desired rate of the zinc recovery.

The flow rate of nitrogen in an amount of more than 3.5 Nm$^3$/min.m$^2$ of the molten bath surface will result in appreciable spattering of the melt which deposits on the furnace walls and roof to cause their destruction. In addition, the amount of effluent gases is increased, the condensation of zinc into metal is deteriorated, and additional gas cleaning installations are required.

As mentioned above, the process should be run at a temperature ranging from 1220 to 1400° C., and, preferably, at those of 1220 to 1290° C.

The process being run at a temperature of less than 1220° C., the slag density is increased, thus deteriorating agitation thereof.

Running the process at a temperature of more than 1400° C., even though this brings about high rate of zinc recovery, will yet result in the increased power input, it being less than in the known methods, and in the low durability of refractory lining. From the foregoing it follows that the process should be preferably run at a temperature of 1220 to 1290° C., the temperature range providing for high rates of zinc removal.

It is advisable that the process be run so that a depth of the molten bath would be within the range of from 500 to 1000 mm.

With the aforesaid molten bath depth being less than 500 mm, the utilization of nitrogen will be incomplete or inefficient.

If, however, the depth of the molten bath is more than 1000 mm, the agitation of said bath with nitrogen is rendered more difficult and the desired effect is not achieved.

It is preferable to feed nitrogen to the molten bath at a rate of 30 to 100 m/sec.

The flow of nitrogen fed to the molten bath at a rate lower than 30 m/sec is insufficient for appropriate agitation of slag, thereby failing to provide a desired rate of zinc recovery.

The supply of nitrogen to the molten bath at the flow rate exceeding 100 m/sec will cause splashing out of said bath and, therefore, is considered inexpedient.

To sum it up, the process should be run in conformity with the conditions prescribed by the invention and whatever departure therefrom will fail to provide the desired end result.

The invention makes it possible:

1/ To step up the rate of recovery of zinc from the molten zinc-containing slag up to 2.3 kg/min.m$^2$ of the molten bath surface by providing better contact between the molten slag and reducing agent, and improving mass exchange in the slag bath;

2/ To decrease the furnace area by more than two times, which decreases heat losses through the furnace walls, roof and hearth;

3/ To lower the consumption of gas required for agitation of the slag bath by five to ten times as compared to the slag-fuming process.

4/ To prolong service life of the furnace refractory lining;

5/ To lower the consumption of power by 30 to 40 percent as compared to the prior-art method.

The invention is readily adaptable for application in industry.

The invention is suitable for treatment both solidified /freezed/ and molten zinc-containing slags.

Moreover, the invention is fit for use in the treatment of hot zinc-containing slags in "combined" processes, i.e., in oxygen-suspended cyclone-electrothermic process widely known in theory and practice as "kivcet".

From the foregoing it follows that the herein proposed method for the recovery of zinc from zinc-containing slags favourably compares with those known in the art, and, therefore, presents great commercial interest.

The invention will be better understood by those skilled in the art from the following examples thereof. /The amounts of components is given in percent by weight/.

EXAMPLE I

Treated in an electric furnace having a melting zone of 4 m$^2$ and a reducing zone of 2 m$^2$ was slag containing 10.8% of zinc, 29.2% of iron, 1.8% of sulphur, 30.3 of silica and 4.2% of calcium oxide, oxygen and impurities being the balance.

The slag was fed to the melting zone at the rate of 1.2 tons per hour, wherefrom it was continuously passed to the reducing zone. The molten slag temperature in the furnace reducing zone was maintained at 1250° C. The depth of the molten slag bath was 500 mm.

Intermittently fed to the furnace reducing zone through the coke supply means was coke, and continuously fed through the gas supply means was, i.e., tuyeres, nitrogen in an amount of 1.33 Nm$^3$/min.m$^2$ of the molten bath surface, flown at the rate of 50 m/sec.

The spent slag tapped out of the furnace reducing zone contained 3.6% of zinc, 31.2% of iron, 0.5% of sulphur, 37.4% of silica and 5.7% of calcium oxide, oxygen and impurities being the balance.

The recovered zinc volatalized to be drawn off in the form of zinc dust containing 70% of zinc, 10% of lead, oxygen and impurities constituting the balance.

The rate at which zinc was recovered was 0.92 kg/min.m$^2$ of the molten bath surface.

EXAMPLE 2

In accordance with the general procedure of Example I, the following continuous run was made.

The slag charged in the electric furnace at the rate of one tone per hour contained 11% of zinc, 30.9% of iron, 1.1% of sulphur, 30.3% of silica. The molten bath temperature was maintained at about 1230° C., the molten bath depth was 500 mm, nitrogen in an amount of 0.53 Nm$^3$/min.m$^2$ of the molten bath surface was fed at the rate of 35 m/sec.

The spent slag contained 3.0% of zinc, 27.2% of iron, 0.6% of sulphur, 34.2% of silica, oxygen and impurities being the balance.

The zinc recovering rate was 0.4 kg/min.m$^2$ of the molten bath surface.

EXAMPLE 3

In accordance with the general procedure of Example 1, the following continuous run was made.

The slag fed into the electric furnace amounted to 3.2 tons per hour, the amount of nitrogen was 3.35 Nm$^3$/min.m$^2$ of the molten bath surface, the nitrogen being fed at the rate of 80 m/sec, the depth of the molten bath was 800 mm. The molten bath temperature was maintained at about 1290° C.

The zinc content in the spent slag was 2.76%, the zinc recovering rate was 2.3 kg/min.m$^2$ of the molten bath surface.

EXAMPLE 4

In accordance with general procedure of Example I, the following continuous run was made.

The composition of slag was similar to that set forth in Example 1.

The slag was charged at the rate of 2.5 tons per hour, the molten bath temperature was maintained at 1400° C., the depth of the molten bath was 500 mm, nitrogen in the amount of 0.835 Nm$^3$/min.m$^2$ of the molten bath surface was fed at the rate of 40 m/sec. The spent slag contained 2.11% of zinc. The zinc recovering rate was 2.25 kg/min.m$^2$ of the molten bath surface.

What is claimed is:

1. A method for recovering zinc from a molten zinc-containing slag bath comprising the steps of:
    reducing zinc containing compounds in said molten slag bath by superimposing said reducing agent onto said molten slag bath and flowing nitrogen into said molten slag bath in an amount of 0.5 to 3.5 $Nm^3/min \cdot m^2$ of the molten bath surface to stir said molten slag bath and mix it with said reducing agent;

maintaining the temperature of said molten slag bath at a temperature ranging from 1220 to 1400° C.; and recovering zinc by condensation from the gases passing out of said molten slag bath.

2. A method as claimed in claim 1, wherein the process is run with the molten bath depth ranging from 500 to 1000 mm.

3. A method as claimed in claim 1, wherein the flow rate of nitrogen fed into the molten bath ranges from 30 to 100 m/sec.

4. A method as claimed in claim 1, wherein the process is run at a temperature of 1220 to 1290° C.

5. The method as claimed in claim 1, comprising the steps of:

delivering said molten slag bath to the reduction zone of an electric furnace;

charging said slag into said reduction zone in an amount sufficient to maintain the depth of said molten slag bath within the range of 500 to 1000 mm.; and, continuously flowing nitrogen into said molten slag bath at a rate of from 30 to 100 m/sec. to provide stirring of said molten slag and improve the contact of said reducing agent therewith.

6. The method as claimed in claim 5, wherein said molten bath temperature is maintained at a temperature of 1220 to 1290° C.

7. The method as claimed in claim 1, wherein:
the temperature of said molten slag bath is maintained at a temperature of 1220 to 1290° C., and
the depth of said molten slag bath is maintained between 500 to 1000 mm.

8. The method as claimed in claim 7, wherein:
said nitrogen is fed into said molten bath at a rate from 30 to 100 m/sec.

* * * * *